May 29, 1956 H. N. GARDNER 2,747,521
FOLDED CAKE MAKING MACHINE
Filed Aug. 13, 1949 2 Sheets-Sheet 2
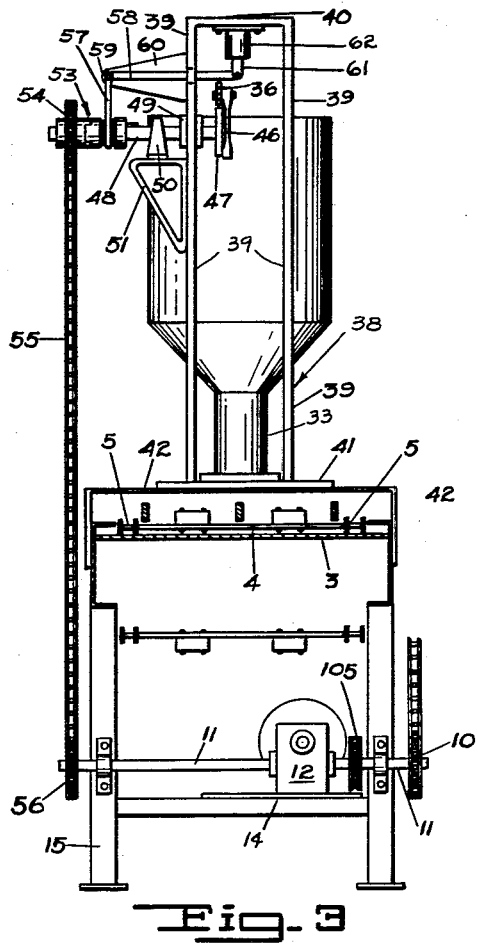
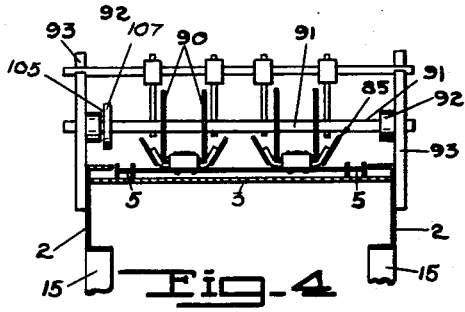
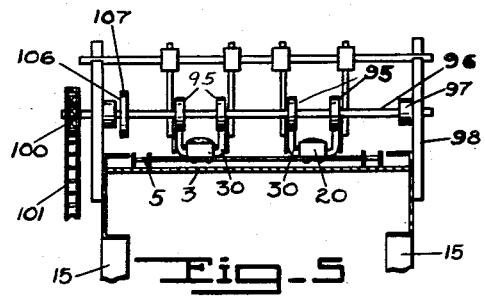
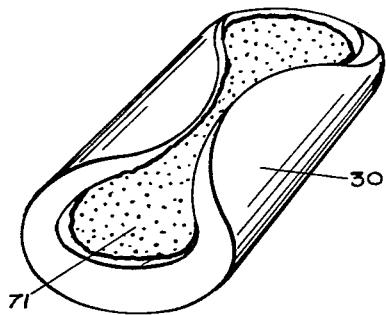
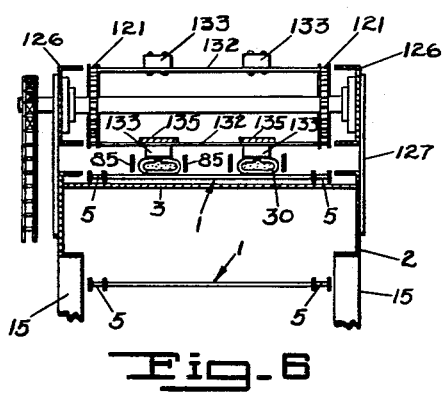
INVENTOR.
HUBERT N. GARDNER.
BY
BayKen, Mahler & Beckley.
ATTORNEYS

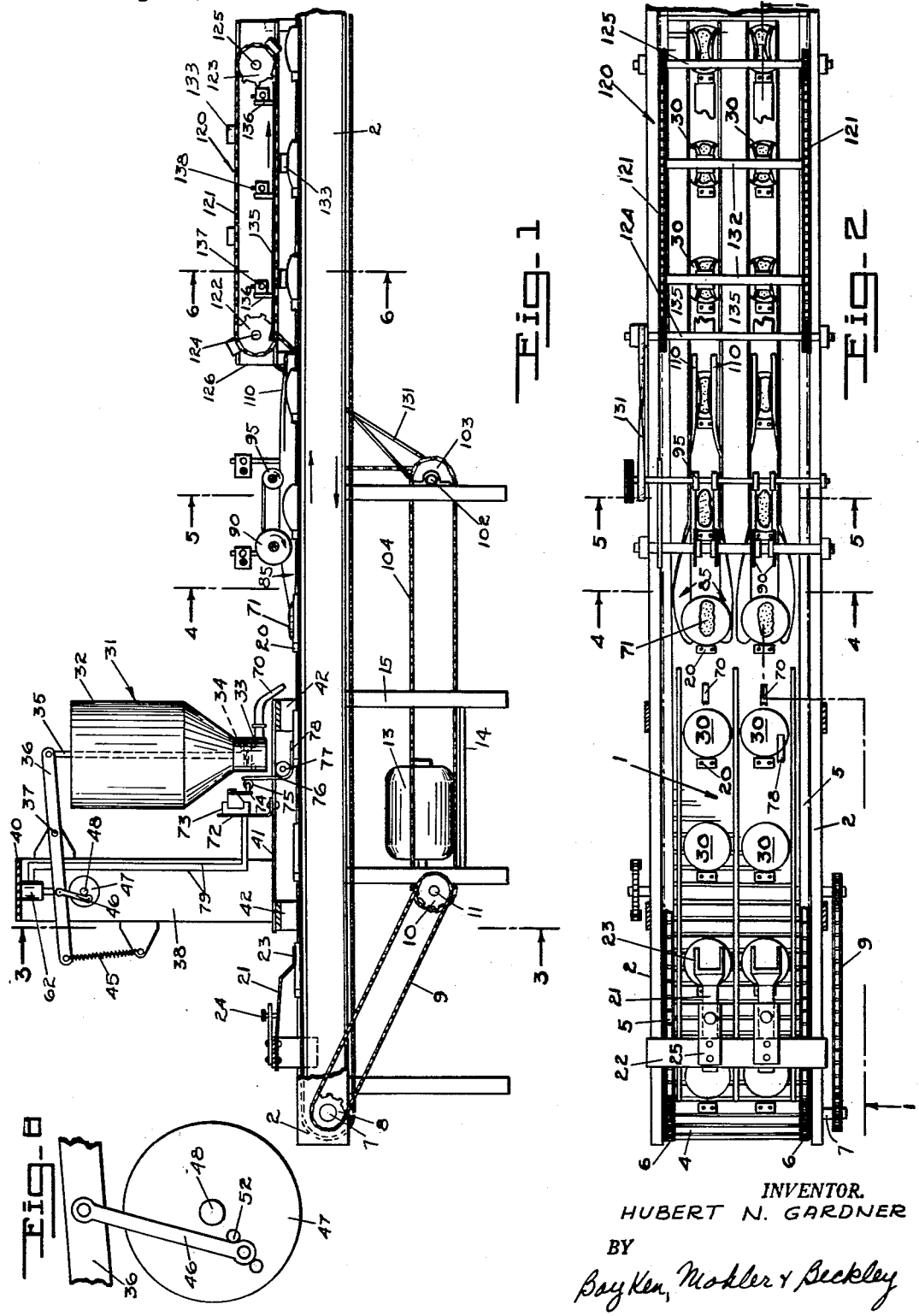

United States Patent Office 2,747,521
Patented May 29, 1956

2,747,521

FOLDED CAKE MAKING MACHINE

Hubert N. Gardner, San Francisco, Calif., assignor to Langendorf United Bakeries, Inc., San Francisco, Calif., a corporation of Delaware Application August 13, 1949, Serial No. 110,069

6 Claims. (Cl. 107—1)

This invention relates to a cake forming machine and more particularly to a machine which may be employed to form a cake of the type having portions of the cake folded over on themselves with a filler of confection or other suitable material between the folds.

Heretofore such folded cakes have been formed by hand by a process in which the operator positions a layer of a baked cake in one hand and using a spatula or other suitable device deposits the filler on the cake with the other hand. In the interest of saving time during this operation, it has been customary to fold the cake over on itself while still positioned in one hand without the use of the other hand which latter hand is reserved for applying the filler.

The manual dexterity required for this operation has in the past required very skillful operators for this forming process and at best the process has resulted in a lack of uniformity between cakes formed by different operators and even between cakes formed by the same operator.

The shape of the cake when properly formed, although attractive to purchasers, is difficult to achieve because it is made from a round disk-like layer of relatively thick material and the forming process requires folding the opposite marginal portions of the cake over into overlying relationship with the remainder of the cake. The purpose of this shape is to permit some of the filler material to extend out between the folds of the cake so that such filler may be viewed by the purchaser. If the cake were made from a square or rectangular layer of material the filling material would be hidden by the folds and the attractive appearance of the cake destroyed.

It is important to note in this connection that the filling material remains at all times on the lower portion of the cake when the marginal portions are folded over and should not extend outwardly beyond the periphery of the cake. Thus it is desirable that the marginal portions of the cake be pressed toward the lower portion of the cake, during forming at a point about centrally of the cake and not adjacent the folds, in which latter case the filler material would be squeezed out beyond the periphery of the cake which is undesirable.

Thus it is seen that the forming process, although possible by the use of two hands, does not lend itself to a speedy manual operation because of the characteristic shape of the cake and the tendency of the filler material to be squeezed out of the cake when improperly folded.

An additional difficulty has been heretofore encountered in this forming process because of the tendency of the folds to swing upwardly away from the filler after the folds are released which tendency requires an additional squeezing operation to reshape the cake before packaging if such unfolding occurs.

One of the objects of this invention is the provision of a machine which overcomes the disadvantages of methods heretofore employed for making folded cakes.

Another object of the invention is the provision of a sanitary folded cake forming machine which eliminates manual manipulation of the cake during the forming operation.

Another object of the invention is the provision of a folded cake forming machine which may be employed to make such cakes more uniformly than is possible by manual methods.

Still another object of the invention is the provision of a machine for making folded cakes which prevents loss of the filler from between the folds.

Other objects and advantages will be seen from the specification and drawings wherein:

Fig. 1 is a semi-schematic side elevational view of the invention partly broken away and with some parts shown in section for clarity.

Fig. 2 is a top plan view of machine shown in Fig. 1 with the dispenser removed for clarity.

Fig. 3 is a transverse cross-sectional view of the machine as taken along lines 3—3 of Fig. 1.

Fig. 4 is a transverse cross-sectional view of the machine as taken along lines 4—4 of Fig. 2.

Fig. 5 is a transverse cross-sectional view of the machine as taken along lines 6—6 of Fig. 1.

Fig. 6 is an enlarged elevational view showing a portion of the device.

Fig. 7 is a perspective view of the finished cake as formed by the invention.

Fig. 8 is an enlarged elevational view showing the crank wheel of the dispenser.

The invention comprises a horizontally disposed conveyor generally designated 1 having an upper run on which the cakes are supported for movement along the length of the conveyor. Longitudinally extending frame members 2 are positioned along the lateral sides of the conveyor and a transverse support 3 (Fig. 3) extending between the frame members is adapted to support the upper run of the conveyor throughout its length. The conveyor 1 is preferably formed from a plurality of transversely extending rigid slats 4 (Fig. 2) which are secured along their opposite ends to chains 5 which in turn are driven by sprocket wheels 6 mounted on a drive shaft 7. This shaft 7 is rotatably supported at each of its ends in the frames 2 and a sprocket wheel 8 is secured to an extension of this shaft and is driven by a chain 9 which in turn is driven by sprocket wheel 10 secured to the shaft 11 of a reducer 12 (Fig. 3). An electric motor 13 is connected to the reducer and supplies the power for all operations of the machine. The electric motor 13 may be mounted on a suitable support 14 secured to legs 15 of the frames 2.

The cakes are placed on the conveyor at the driven end (the left end as seen in Figs. 1 and 2). The cake, prior to the forming operation performed by the machine is disk-shaped and is generally cut from a larger cylindrical-shaped cake so that each cake as it is taken from the oven is sliced to form two circular disk-shaped cakes which are placed on the conveyor. These cakes are preferably placed on the conveyor with the smooth side down so that the upper face which has been formed by a band saw is facing upwardly. Thus, the relatively rough upper side receives the filler and smooth lower side becomes the exterior of the filled cake as it is finally formed.

The cakes, when on the conveyor are automatically supplied with the filler material which material is preferably deposited at equally spaced points along the length of the conveyor as the conveyor moves past the dispensing poing. For this reason it is important that the cakes be positioned on the conveyor so that adjacent cakes are equally spaced from each other. For this purpose I provide stops 20 at spaced points along the length of the conveyor, which stops may be rigidly secured to the slats 4 in any desired manner. Arms 21 are provided above the conveyor for the purpose of engaging each cake as it moves along the conveyor and for urging the cake rearwardly against the stops 20. In the drawings two longitudinally extending rows of cakes are shown on the conveyor 1, but it will be apparent that only one row may be employed if desired or any number of rows greater than one.

The arms 21 are stationarily supported at one of their ends on a support 22 extending transversely across the conveyor and which support is secured at its ends to the frames 2. These arms 21 extend downwardly and forwardly and terminate at their free ends in a pair of laterally spaced fingers 23 which are adapted to engage each cake as the latter moves forward on the conveyor. These arms are preferably formed of a resilient material such as sheet steel so that the fingers 23 will yieldably move upwardly against the resistance of the cake when the latter engages one of the stops 20. It will be noted that the spaced fingers 23 also serve to center the cake transversely of the conveyor so that inasmuch as the spacing between the fingers is at least equal to the radius of each cake, and may be slightly greater, but less than the diameter of each cake, all the cakes in one longitudinal row are in alignment. For the purpose of selectively varying the resistance of the arm 21 an adjusting screw 24 is provided engaging arm 21 and threadedly secured to a bracket 25 which in turn is mounted on the support 22 (Fig. 1), and which screw is over the arm 21 and bears against said arm.

In the drawings the cakes are designated 30 and it may be seen that each one is in engagement with a stop 20 at its trailing edge, the curved leading edge having passed between fingers 23 so that the fingers would center the cake on the conveyor.

For the purpose of depositing a measured quantity of filling on the cakes as they move forward on the conveyor a dispenser 31 is provided which is generally of a conventional form having a cylindrical reservoir 32, the sides of which taper downwardly and inwardly and terminate in a relatively narrow throat 33 in which a piston 34 is slidably received. A vertically extending piston rod 35 is secured to the piston 34 and is connected at its upper end to an actuating rocker arm 36 pivoted intermediate its ends to a pivot 37 carried by a frame 38. Frame 38 comprises a pair of vertically extending transversely spaced legs 39 connected at their upper ends by a cross piece 40 (Fig. 3).

The legs 39 are secured at their lower ends to a mounting plate 41 which in turn is connected to the frames 2 by means of supports 42. The dispenser 31 may also be secured at its lower end to mounting plate 41 in any desired manner.

A spring 45 (Fig. 1) is connected to the actuating arm 36 at the end opposite the end to which the piston is secured and this spring urges the piston upwardly at all times.

Pivotally secured to the actuating arm 36 intermediate the pivot 37 and the spring 45 is a connecting rod 46 which connects the arm 36 with a crank wheel 47 mounted on shaft 48. Referring to Fig. 3 it is seen that the shaft 48 is rotatably secured to one of the legs 39 by means of bearing 49 and is also supported in bearing 50 which in turn is carried by bracket 51 secured to leg 39. Rotation of shaft 48 will cause the actuating arm 36 to rock on pivot 37 thereby reciprocating the piston 34 to intermittently eject the filling material.

The quantity of filling material ejected by the piston 34 may be adjusted by varying the stroke of the connecting rod 46. Referring to the enlarged view of the crank wheel shown in Fig. 8 a radially extending row of apertures 52 may be formed in the crank wheel for receiving the pivot for the connecting rod 46. By this structure the stroke of the connecting rod may be varied to suit the quantity of filler desired.

Secured to shaft 48 is a clutch 53 (Fig. 3) for the purpose of disconnecting the shaft 48 from the sprocket wheel 54 which is also mounted on shaft 48 and which is driven by a chain 55 connected to a sprocket wheel 56 carried by the shaft 11 on the reducer.

A vertically extending clutch arm 57 coacts at its lower end with the clutch 53 and is rigidly secured at its upper end to one end of a horizontally disposed rod 58.

A pivot 59 secured to a bracket 60 supports one end of the rod 58 adjacent its juncture with clutch arm 57. The other end of the rod 58 is connected to the outer end of a solenoid plunger 61 which is carried by a vertically disposed solenoid 62 secured at its upper end to top 40. Upon energizing the solenoid 62 it will be seen that the clutch 53 will be disengaged thereby stopping rotation of shaft 48.

Referring to Fig. 1 it is seen that upon downward movement of piston 34 a quantity of filling will be discharged downwardly from the dispenser 31 through outlet conduits 70 communicating with the throat 33 of the dispenser. The dispenser 31 is omitted from Fig. 2 for clarity but it will be understood that there is one outlet conduit 70 for each longitudinally extending row of the cakes 30 centered over the path of travel of the cakes of each row.

The frequency of reciprocation of piston 34 may obviously be predetermined by suitably proportioning the number of teeth on sprocket wheels 54 and 56 so that a discharge stroke of piston 34 occurs when a cake is in such a position that the filler will be deposited on each cake as indicated in Fig. 2 wherein the deposited filler is indicated in Fig. 2 wherein the deposited filler is indicated at 71. Inasmuch as the filler material is quite viscous, such as thick whipped cream, etc. the discharge of the filler will immediately cease upon commencement of the upstroke or suction sproke of the piston. The piston 34 is of the type having a valve mounted therein, which valve opens on the upstroke to allow feeding of the filler from reservoir 32 to the throat 33 and closes on the downstroke to discharge a portion of the filler within the throat 33 and outlet conduits 70.

In the event that the speed of the conveyor 1 and rate of dicharge of the dispenser 31 are not readily proportionable, I have provided a regulating means for insuring a properly timed discharge of the dispenser 31 with respect to the cakes 30.

Secured to mounting plate 41 by bracket 72 is a micro switch 73 having the conventional actuating arm 74 with a roller 75 at its free end. A vertically extending lever 76 is adapted to actuate the switch 73 by engagement with the roller 75 when said lever 76 is swung to the left as seen in Fig. 1. Lever 76 is secured at its lower end to a bearing 77 which in turn is pivoted to the mounting plate 41 in any suitable manner. Integrally secured to the lower end of lever 76 and extending forwardly of the bearing 77 is a horizontally disposed arm 78 which is adapted to engage each of the cakes 30 as they move forwardly on the conveyor. As seen in Fig. 1, upon engagement of the arm 78 by a cake 30, said arm will be swung upwardly thereby causing the lever 76 to swing to the left to actuate the switch 73. Wires 79 connect the switch 73 to the solenoid 62 (Fig. 1). Upon closing switch 73 the solenoid 62 will cause the disengagement of the clutch 53 thereby stopping rotation of shaft 48 and reciprocation of the piston 34. When one cake 30 moves out of engagement with the arm 78 the solenoid will be deenergized to permit discharge of a quantity of filler on that cake. Thus it is seen that switch 73 provides a positive means for insuring a discharge of filler on each cake 30.

After the filler has been deposited on a cake, the cake is engaged by a pair of folding elements 85 for the purpose of folding the opposite sides of the cake upwardly. Each of these elements 85 comprises an elongated flat bar which is formed with the end nearest the dispenser generally horizontal and with its intermediate portion sloping progressively upwardly (Fig. 4) until the flat bar becomes vertical (Fig. 5).

A pair of transversely spaced disks 90 (Figs. 1, 2 and 4) are positioned between the folding elements 85 adjacent the sloping portion thereof for the purpose of urging the cakes 30 downwardly against the conveyor 1 at spaced points inwardly of the elements 85. These disks 90 are secured to shaft 91 which is rotated in clockwise direction as seen in Fig. 1 to urge the cakes 30 rearwardly of the direction of travel of the conveyor and against the stops 20. At the same time the disks 90 score the cakes slightly thus defining the folds. It is pertinent to note that this scoring operation is very slight as a distinct break in the cake at the points of folding would be undesirable. The shaft 91 is rotatably supported at each of its ends in bearings 92 which in turn are mounted on supports 93 extending upwardly from and secured to frames 2.

A pair of transversely spaced rollers 95 (Figs. 1, 2, 4) are positioned between the folding elements 85 adjacent the vertical portions thereof and are adapted to engage the upwardly facing edges of the cakes 30 for urging said cakes downwardly against the conveyor 1. These rollers are driven in the same direction as the disks 90 and also serve to urge the cakes against the stops 20. Referring to Fig. 5, it is seen that these rollers 95 are effective in centering the cake between the folding elements 85 in the event that one edge of the cake is higher than the other before the rollers 95 are engaged. The rollers 95 are supported on a shaft 96 which is rotatably secured at its ends in bearings 97 mounted on supports 98 extending upwardly from and secured to frames 2. The shaft 96 is provided at one of its ends with an extension having a sprocket wheel 100 secured thereto. This sprocket wheel is driven by a vertically extending chain 101 which in turn is driven by a sprocket wheel on shaft 102 (Fig. 1) rotatably mounted on legs 15 under the conveyor 1. The shaft 102 is provided with a sprocket wheel 103 driven by chain 104 from a sprocket wheel 105 on the shaft 11 of reducer 12 (Fig. 3). Both shafts 91 and 96 are provided with pulleys 105 and 106 respectively which are connected by belt 107 which drives the shaft 91 from shaft 96.

The folding elements 86 are provided, forwardly of the rollers 95, with longitudinally extending strips 110 which slope downwardly and inwardly on each side of the cake 30 from a point adjacent the rollers 95 and terminate in a horizontal portion at a point remote from the rollers 95 and forwardly thereof. The strips 110 which are preferably integrally connected to the folding elements 85 serve to fold the marginal portions of the cake downwardly from a vertically extending position to a position with said marginal portions overlying the remainder or central portion of the cake and with the filling between the folds (Figs. 1, 2).

As explained hereinbefore, the folded portions of the cake have a tendency to swing upwardly after they have been folded on the cake since there is a substantial amount of resiliency in the cake because it is relatively thick. To prevent such unfolding I have provided an effective means for retaining the shape of the cake after it has been formed by the folding elements 85 and particularly the strips 110.

Mounted above the conveyor 1 is a hold down conveyor generally designated 120 comprising a pair of transversely spaced chains 121 which extend longitudinally of the conveyor. These chains connect rear sprocket wheels 122 and forward sprocket wheels 123 which are mounted on shafts 124 and 125 respectively (Fig. 1). A pair of longitudinally extending frame members 126 are supported above and parallel to main frames 2 by means of vertically extending supports 127. These frames 126 are provided with bearings 128 in which shafts 124 and 125 are rotatably supported. Shaft 124 is provided with an extension to which is secured a sprocket wheel 130 carrying a chain 131 which is driven off shaft 102 (Fig. 1). The conveyor 120 is constructed so that the speed of chain 121 is equal to the speed of chain 5 of conveyor 1.

Transversely extending bars 132 extend between chains 121 and are rigidly secured thereto at their ends. These bars 132 are spaced apart a distance equal to the space between straps 20 on conveyor 1 or in other words the pitch of the bars is equal to the pitch of the cakes on conveyor 1. As may be seen in Figs. 1, 2 and 6, each bar 132 carries a pair of blocks 133 which are positioned so that each block engages a cake 30 as the latter moves along conveyor 1 and as the conveyor 120 is moving with the speed of conveyor 1. The distance between shafts 124 and 125 must of course be determined so that all blocks 133 are equally spaced from each other in a direction longitudinally of the path of travel of the cakes. The length of the conveyor 120 should be made as long as possible without extending the machine beyond practical limits so that the blocks 133 engage the cakes long enough to prevent unfolding.

For the purpose of positively forcing the blocks 133 downwardly against the cakes 30 a pair of guides 135 are provided extending longitudinally of the conveyor 1 and positioned so that bars 132 of the lower run of conveyor 120 pass under the guides 135 with the sides of the bars opposite those to which the blocks 133 are secured in sliding engagement with the guides. The guides 135 are preferably curved upwardly slightly adjacent the rear end of the conveyor 120 to permit the bars 132 to move under the guides. Transverse supports 136 secured at their ends to the frames 126 by means of bolts 137 serve to support the guides 135. For the purpose of vertically adjusting the guides 135 the frames 126 may be provided with elongated slots 138 (Fig. 1) for receiving the bolts 137.

After the cakes move out of engagement with the blocks 133 they may be removed from the conveyor and packaged. The conveyor 120 has the effect of positively pressing the marginal portions of the cake against the remainder of the cake at a point approximately centrally of the cake so that the filling is not squeezed out adjacent the folds of the cake. Any filling which is squeezed out from between the folds of the cake will be adjacent the center of the cake and will not extend beyond the periphery of the cake.

The use of the machine herein described completely eliminates manual forming of folded cakes of this nature and results in substantial saving in the cost of operation. It has been found that more than 100 cakes per minute may be formed with the machine herein described employing two longitudinal rows of cakes. This speed is well in excess of the productivity of a substantial number of skilled operators and the cakes thus formed are uniform in appearance.

The embodiment herein described is not to be construed as a limitation of the invention but merely as a preferred form thereof, it being obvious that modifications may be made to the device herein described without departing from the spirit of the invention.

I claim:

1. In a cake former for folded cakes which includes a conveyor for supporting flat circular layers of cake for movement along a predetermined path of travel and a dispenser over said path and positioned centrally of the latter for depositing a filler on each of said layers prior to folding thereof: positioning means engageable with said layers during said movement for centering said layers on said path in a position to receive a quantity of filler from said dispenser centrally between the lateral side edges of said layers, said means including a pair of fixed layer engaging elements spaced transversely of said path a distance less than the diameter of said layers and adapted to yieldably engage the leading edge of each of said layers at points adjacent to but on opposite sides of the centers of said layers whereby said layers will be shifted laterally of said path to a position centrally of the same.

2. In a cake former for folded cakes which includes a conveyor for supporting flat circular layers of cake for movement along a predetermined path of travel and a dispenser over said path and positioned centrally of the latter for depositing a filler on each of said layers prior to folding thereof: positioning means engageable with said layers during said movement for centering said layers on said path in a position to receive a quantity of filler from said dispenser centrally between the lateral side edges of said layers, said means including a pair of fixed layer engaging elements respectively spaced on opposite sides of the centerline of said path a distance less than the radius of said layers and adapted to yieldably engage the leading edge of each of said layers at points on opposite sides of the centers of said layers whereby said layers will be shifted laterally of said path to a position centrally of the same, a plurality of stops equally spaced longitudinally of said conveyor and adjacent the trailing edges of said layers for preventing movement of said layers rearwardly of said conveyor past said stops when said layers are engaged by said elements, whereby said layers are positioned at equally spaced points longitudinally of said conveyor.

3. In a cake former for folded cakes which includes a conveyor for supporting flat circular layers of cake for movement along a predetermined path of travel and a dispenser over said path and positioned centrally of the latter for depositing a filler on each of said layers prior to folding thereof: positioning means engageable with said layers during said movement for centering said layers on said path in a position to receive a quantity of filler from said dispenser centrally between the lateral side edges of said layers, said means including a pair of fixed layer engaging elements respectively spaced on opposite sides of the centerline of said path a distance less than the radius of said layers and adapted to yieldably engage the leading edge of each of said layers at points on opposite sides of the centers of said layers whereby said layers will be shifted laterally of said path to a position centrally of the same, a plurality of stops equally spaced longitudinally of said conveyor and adjacent the trailing edges of said layers for preventing movement of said layers rearwardly of said conveyor past said stops when said layers are engaged by said elements, whereby said layers are positioned at equally spaced points longitudinally of said conveyor, said dispenser being actuated by power means to intermittently discharge a predetermined quantity of filler, means actuatable by said layers for interrupting operation of said power means for timing the discharge of said dispenser to insure depositing said filler on each of said layers.

4. A cake former for folded cakes comprising: a conveyor for supporting flat layers of cake for movement along a path of travel, holding means engageable with the upper surfaces of said layers along spaced lines parallel to said path and defining the fold lines of said layers and positioned above said conveyor for holding said layers downwardly against said conveyor, a pair of elongated stationary guides extending longitudinally of said conveyor between points on opposite sides of said holding means and engageable with the opposite marginal portions of said layers that are outwardly of said lines for folding said portions upwardly and inwardly of said layers to positions overlying the central portions of said layers.

5. A cake former for folded cakes comprising: a conveyor for supporting flat layers of cake for movement along a path of travel, holding means engageable with the upper surfaces of said layers along spaced lines parallel to said path and defining the fold lines of said layers and positioned above said conveyor for holding said layers downwardly against said conveyor, a pair of elongated stationary guides extending longitudinally of said conveyor between points on opposite sides of said holding means and engageable with the opposite marginal portions of said layers that are outwardly of said lines for folding said portions upwardly and inwardly of said layers to positions overlying the central portions of said layers, said holding means being formed at their points of engagement with said layers for scoring the upper surfaces of said layers along said lines to facilitate folding the same.

6. A cake former for folded cakes comprising: a conveyor for supporting flat layers of cake for movement along a path of travel, holding means engageable with the upper surfaces of said layers along spaced lines parallel to said path and defining the fold lines of said layers and positioned above said conveyor for holding said layers downwardly against said conveyor, a pair of elongated stationary guides extending longitudinally of said conveyor between points on opposite sides of said holding means and engageable with the opposite marginal portions of said layers that are outwardly of said lines for folding said portions upwardly and inwardly of said layers to positions overlying the central portions of said layers, centering means engageable with the upwardly directed edges of said marginal portions at the point in said path where said portions extend generally vertically upwardly from said conveyor for laterally shifting such layers which are offset from a predetermined path centrally between said guides for positioning such layers in said path.

References Cited in the file of this patent

UNITED STATES PATENTS

| Number | Name | Date |
|---|---|---|
| 628,449 | Carr | July 11, 1899 |
| 1,858,175 | Tunstall | May 10, 1932 |
| 2,089,396 | Meilstrup | Aug. 10, 1937 |
| 2,246,477 | Attaway et al. | June 17, 1941 |
| 2,260,686 | Segrin | Oct. 28, 1941 |
| 2,261,043 | Winfree | Oct. 28, 1941 |
| 2,365,349 | McManus | Dec. 19, 1944 |
| 2,394,795 | Manspeaker | Feb. 12, 1946 |
| 2,520,493 | Curlee | Aug. 29, 1950 |